No. 609,471. Patented Aug. 23, 1898.
B. E. SLUSSER.
CHAINLESS BICYCLE GEARING.
(Application filed Nov. 29, 1897.)
(No Model.)
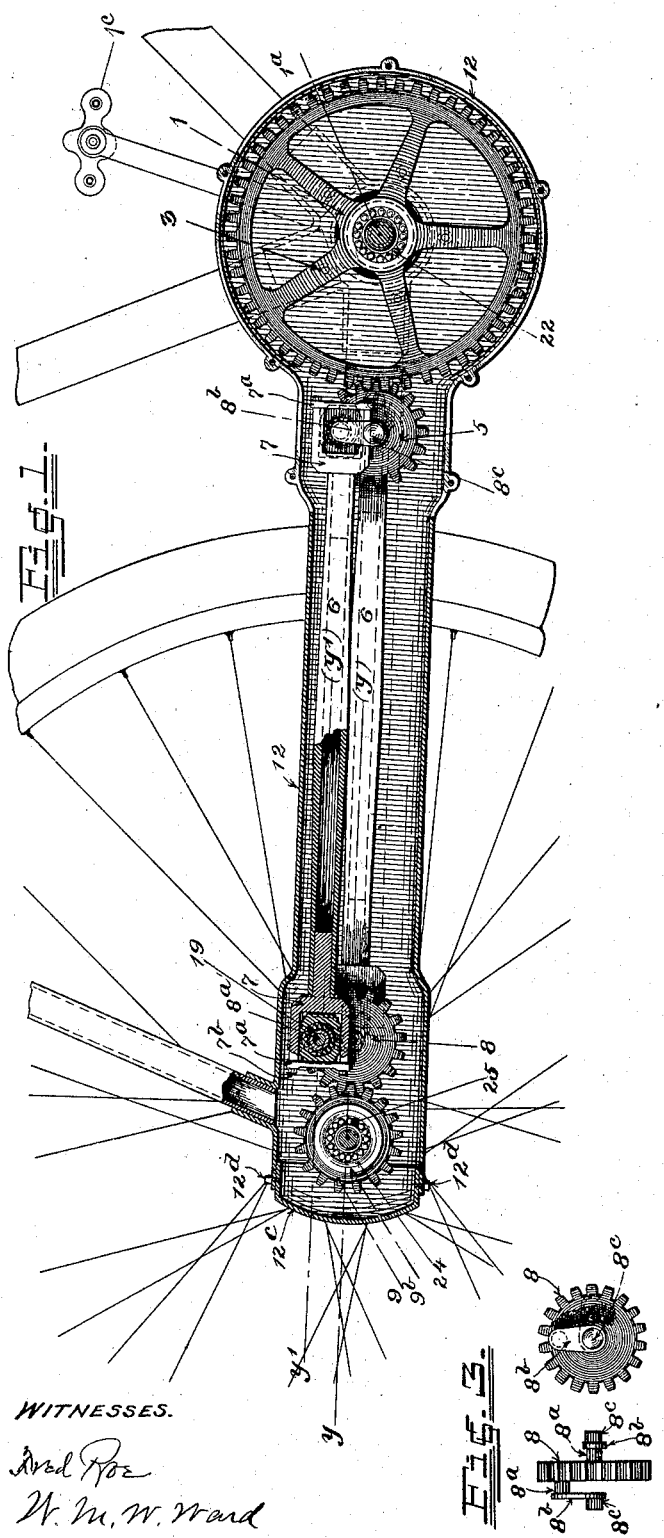
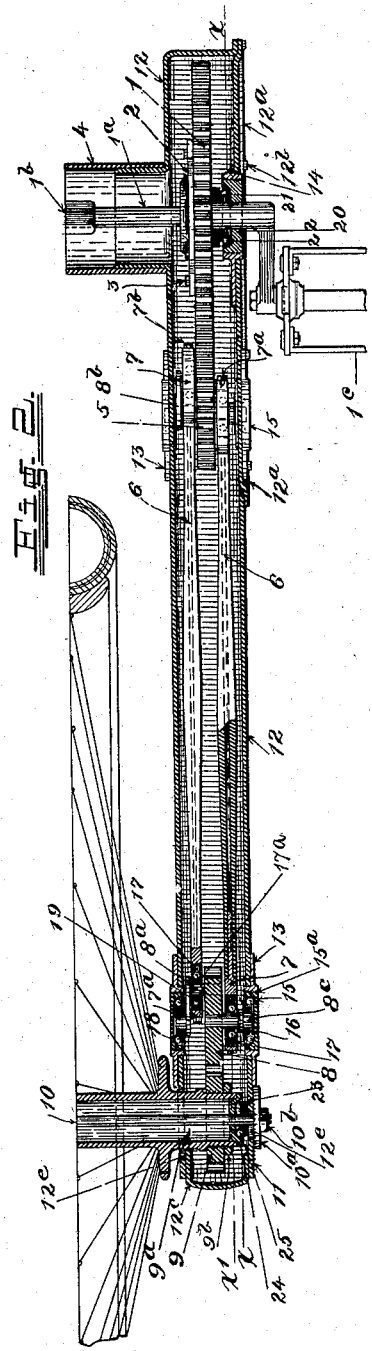
WITNESSES.
INVENTOR.
Burt. E. Slusser.
BY Hunt & Henry
ATTORNEYS

UNITED STATES PATENT OFFICE.

BURT E. SLUSSER, OF DENVER, COLORADO.

CHAINLESS BICYCLE-GEARING.

SPECIFICATION forming part of Letters Patent No. 609,471, dated August 23, 1898.

Application filed November 29, 1897. Serial No. 660,133. (No model.)

*To all whom it may concern:*

Be it known that I, BURT E. SLUSSER, a citizen of the United States of America, residing at Denver, in the county of Arapahoe and State of Colorado, have invented certain new and useful Improvements in Chainless Bicycle-Gearing; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to chainless bicycle-gearing in which the power is transmitted by a train of gear-wheels and connecting-rods, and has for its object to provide a running-gear for bicycles which will dispense with the ordinary endless chain and sprocket generally employed for the purpose of propelling the machine, will reduce the friction incident to such sprocket chain and wheel, and will prevent the accumulation of dirt gathered by said chain during the running of the bicycle.

In the accompanying drawings, Figure 1 represents a longitudinal side elevation with the fore gear in full figure, the rear-gear bearing and pitman-head being in section, respectively, on line $x$ $x$ of Fig. 2 and line $x'$ $x'$ of Fig. 2, and the outer boxing being in section, except the covering for the forward gearing, which is a plate and is represented as removed. Fig. 2 is a plan view from above with the forward gearing in full figure, the rear-gear bearing in section on line $y$ $y$ of Fig. 1, and the pitman-head in section on line $y'$ $y'$ of Fig. 1, the outer boxing being shown in section. Fig. 3 is a detail view, in side and edge elevation, of the pinion, pinion-crank, and axle.

The crank-hanger of the bicycle is represented by 4. In place of one of the usual rear forks of the frame there is a large tubular covering 12, which incloses the greater part of the gear and conforms to its general contour. This covering 12 is brazed at its forward end to the crank-hanger by an outwardly-extending flange around the edge of a circular opening in the inner side of the covering. Said flange fits within the barrel crank-hanger and forms a reinforcement. The covering 12, at the rear, is brazed to one of the rear braces of the frame.

The outer side of the forward part of the covering 12, in which the crank-shaft bearings are located, is a detachable plate $12^a$, which extends back so as to cover the forward gear-wheels within and is attached to the main covering by screws $12^b$.

At the rear end of the covering 12, which is open, a cap $12^c$ is attached by screws $12^d$.

Through the crank-hanger passes the crank-shaft $1^a$ in two parts, coupled by a nut $1^b$. One part of said shaft extends through the opening in the inner side of the covering 12 and also through a corresponding opening in the plate $12^a$, in which are located the bearings for the shaft. These bearings consist of the annular cup 20, cone 21 on the crank-shaft, and balls 22 between said cup and cone.

The cup 20 is screwed into an annular ring 14, which has a flange projecting radially on its outer periphery. This flange acts as a reinforcement, bearing against the inner side of plate $12^a$ when the ring 14, containing the cup 20, is inserted in the opening in the plate made of such size as to fit it.

On the crank-shaft is mounted within the tubular covering, and therefore between the crank-shaft bearings 20 21 22 and the crank-hanger, a spider 2, which has arms, to which are attached by screws 3 corresponding inwardly-extending arms of the rim 1, which has cog-teeth on its outer periphery. At the end of the crank-shaft are the crank and pedal $1^c$, attached as usual.

Within the covering 12 is the pinion gear-wheel 5, meshing with and in the rear of the gear-wheel 1, and the pinion gear-wheel 8, meshing with and in front of a gear-wheel 9, mounted on the hub $9^a$ of the rear bicycle-wheel and secured thereon by a lock-nut $9^b$. Each of these gear-wheels 5 and 8 has on each side, near its rim, a pin $8^a$ at right angles to its surface. These pins $8^a$ are secured to one end of cranks $8^b$, at the other end of which and in a line with the center of each gear-wheel 5 and 8 are journals $8^c$ at right angles to said cranks and having bearings in either side of the covering 12. These bearings consist of cups 15, cones 16, mounted on the pinion-journals $8^c$, and balls 18 between said cups and cones.

The cups 15 are threaded at 15ª on their outer rim to screw into the annular rings 13, which have flanges on their peripheries projecting radially and bearing against the covering 12 as a reinforcement on the outside when the rings 13, containing the cups, are inserted in openings prepared to receive them in said covering.

On the pins 8ª on each side of each gear-wheel 5 and 8 are mounted pitman-heads 7, said heads on each side being respectively connected by a pitman-rod 6. These pitman-heads 7 have inserted in them annular cones 17, V-shaped on their inner rims, and on the pins 8ª are mounted corresponding cups 17ª with V-shaped outer rims. These cups and cones form between them an annular channel, quadrangular in cross-section, in which balls 19 run. The cones 17 are held in the pitman-heads by locking-bars 7ª on the ends of the heads, fastened by screws 7ᵇ. The pins 8ª are so attached to the gear-wheels that the pitman-heads on each side of the wheel 5 or 8 do not come opposite each other, but at an interval along the rim, so that a dead-center will not occur.

The rear hub 9ª, before mentioned, passes through an opening in the inner side of the covering 12, is tubular, and through it passes the rear axle 10, which extends through an opening in the outer side of the covering 12 and is fastened to it by a nut 10ᵇ and washer 10ª, serrated on its inner face to meet the face of the covering 12, which is correspondingly serrated at 11. The rear hub has in its open end, within the covering 12, a cup 24. Corresponding to this is a cone 23 on the axle 10, and between the cup and cone are balls 25, forming bearings for the rear wheel.

The operation of my invention is as follows: The application of power to the pedal 1ᶜ causes the forward gear-wheel to revolve by means of the crank and shaft 1ª, which gear-wheel in turn engages the fore-pinion gear-wheel 5, which by means of the pitman-rods 6 and connections causes the rear-pinion gear-wheel 8 to revolve. The latter gear-wheel engages the rear gear-wheel 9, secured to the hub 9ª, and causes the rear wheel to revolve, thus propelling the bicycle.

Having thus described my invention, what I claim, and desire to secure by Letters Patent, is—

In a bicycle, a gear-wheel carried by the pedal-shaft, in combination with another gear-wheel on the hub of the rear wheel, a pair of intervening gear-wheels, geared respectively to the wheels first above mentioned, and provided on each side with wrist-pins arranged at different points of the periphery, a pair of pitmen provided at each end with heads which fit on the said wrist-pins, and a covering or casing which takes the place of a rear fork or bar of the frame and incloses all of the said gears and pitmen, besides affording bearings for the wheels which carry the said wrist-pins substantially as set forth.

In testimony whereof I affix my signature in presence of two witnesses.

BURT E. SLUSSER.

Witnesses:
 W. M. W. WARD,
 FRED ROE.